April 4, 1961  W. POHEIM  2,978,105
MECHANISM FOR REMOVING SCREENINGS FROM BAR SCREENS
Filed Aug. 3, 1956  3 Sheets-Sheet 1
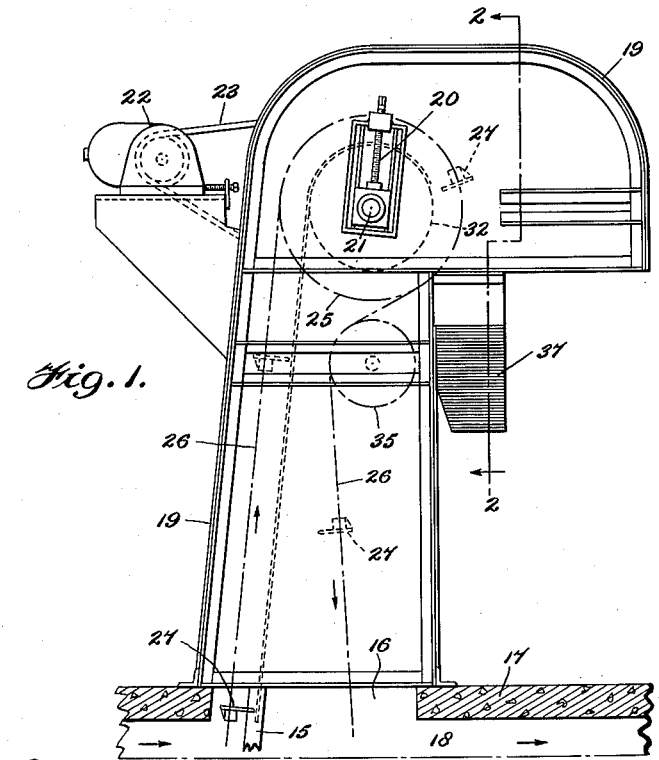
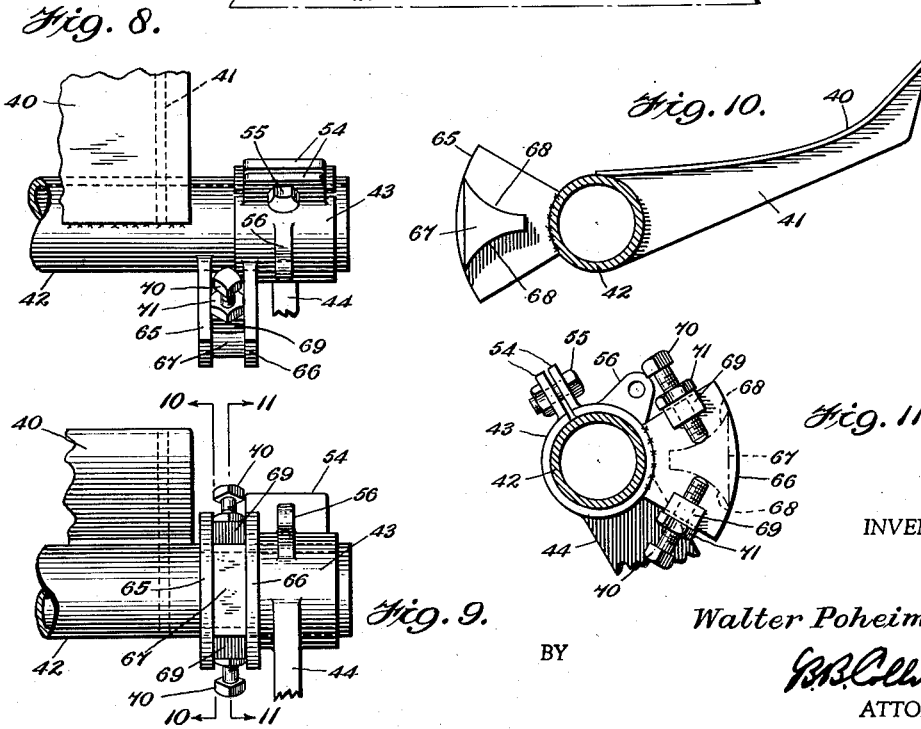
INVENTOR
Walter Poheim,
BY
ATTORNEY

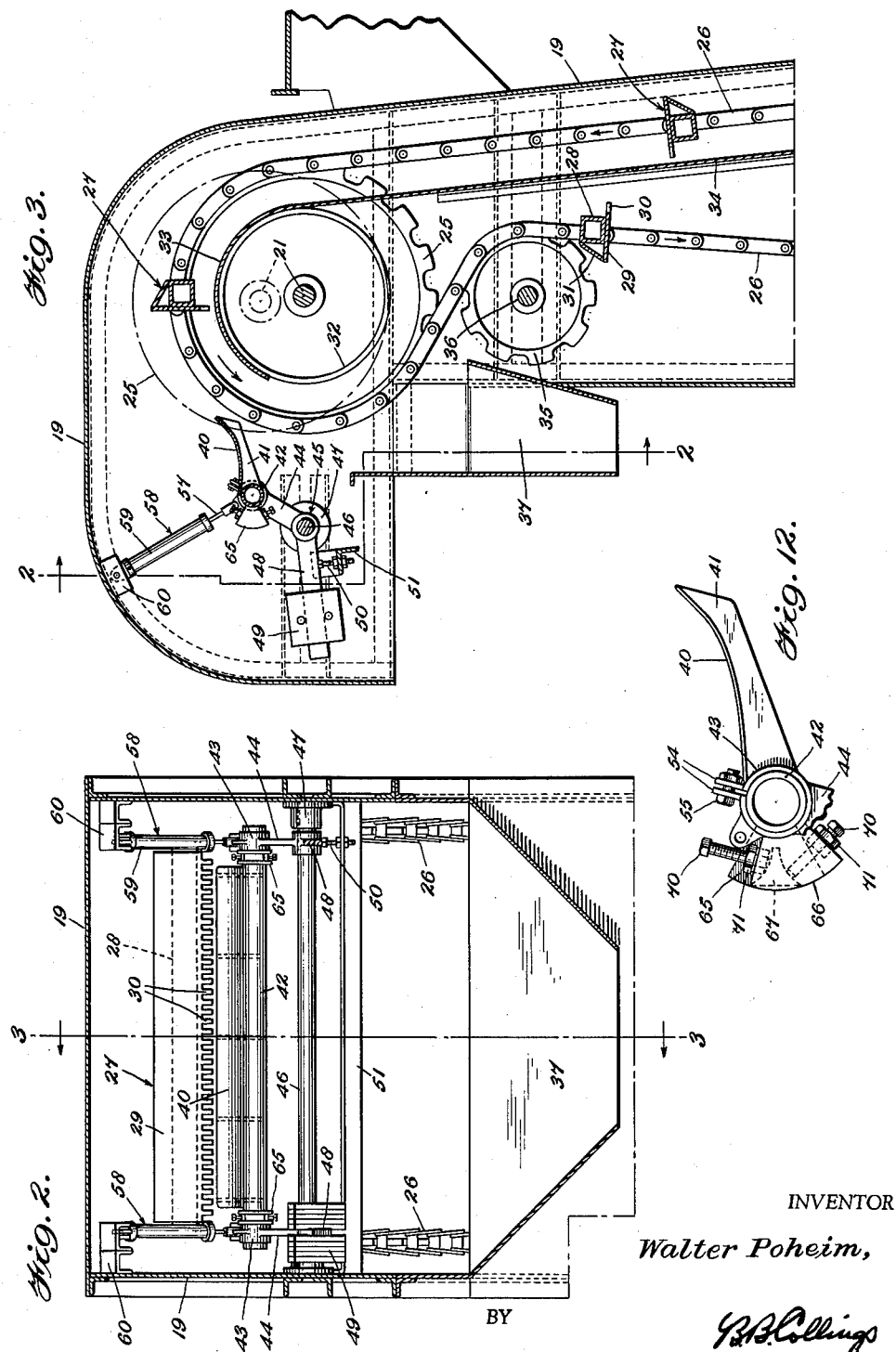

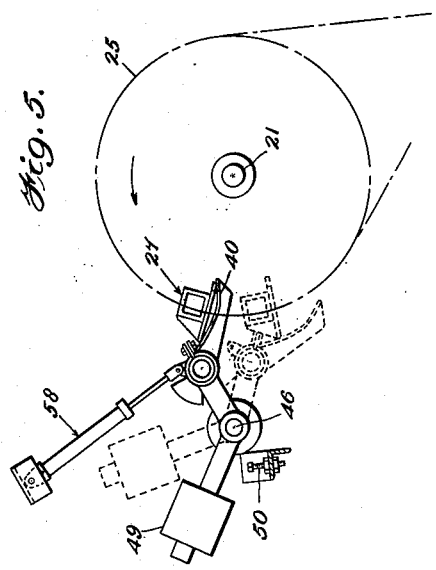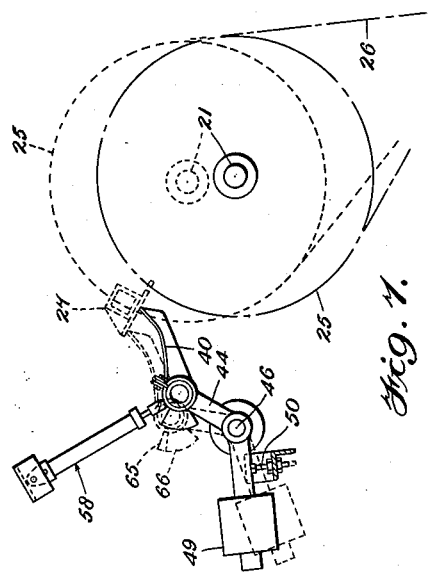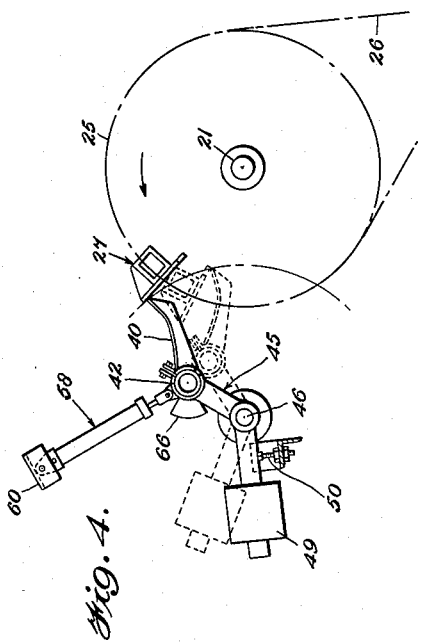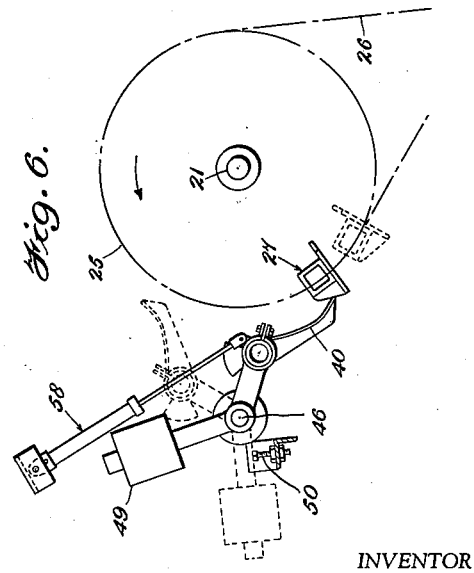

United States Patent Office 2,978,105
Patented Apr. 4, 1961

2,978,105

MECHANISM FOR REMOVING SCREENINGS FROM BAR SCREENS

Walter Poheim, Milwaukee, Wis., assignor to Chain Belt Company, Milwaukee, Wis., a corporation of Wisconsin Filed Aug. 3, 1956, Ser. No. 601,958

2 Claims. (Cl. 210—159)

This invention relates to mechanically cleaned bar screens such as are extensively employed in sanitation, industrial and other plants for removing relatively large floating and semi-floating solids or debris from water, and a typical example of which may be found in prior U.S. Patent No. 1,912,020 to Robert T. Steindorf.

As is well known to those skilled in this art, in addition to the bar screen itself such apparatus commonly includes means for automatically removing the screenings therefrom whereby to avoid undue impedance to the liquid flow, such means comprising one or more rake elements arranged to be positively moved along the face of the screen from the bottom to the top thereof, with the rake teeth extending into and traveling in the spaces between the screen bars. As disclosed in said prior patent, the rake elements are carried by a pair of transversely spaced endless chains which are trained about foot sprockets located in the water channel adjacent the bottom of the screen, and head sprockets mounted some distance above the top of said channel and driven by a suitable source of power. At a point intermediate the channel top and head sprockets, rake scraping or wiping mechanism is provided for effecting discharge from the rakes of the debris they have dislodged and elevated from the bar screen, such wiping means being successively engageable by the several rakes and operable by the movement thereof to sweep across the rake face whereby to scrape the screenings therefrom and into an appropriate receptacle or other trash disposal means.

It is the principal object of the present invention to provide an improved rake wiping mechanism of the general character just referred to, which is universally adaptable to all bar screen installations having traveling cleaning rakes as above set forth; which is quiet in operation; and which is highly efficient in securing complete discharge of all types of debris from the rakes and from itself.

A preferred form of the apparatus is illustrated in the accompanying drawings constituting a part of this specification, in which:

Figure 1 is a side elevational view, partly diagrammatic, of the upper portion of a typical mechanically cleaned bar screen installation of the character above set forth;

Fig. 2 is an enlarged vertical sectional view on approximately the planes indicated by the lines 2—2 in Figs. 1 and 3, looking in the direction of the respective arrows, and showing one form of rake wiping mechanism constructed and arranged in accordance with the invention;

Fig. 3 is a vertical sectional view at right angles to Fig. 2, on the plane indicated by the line 3—3 therein and looking in the direction of the arrows;

Figs. 4, 5 and 6 are like partial elevational views illustrating successive positions assumed by a screen cleaning rake element and the present rake-wiping mechanism during a cycle of operation of the latter;

Fig. 7 is a view similar to Fig. 4 but showing an adjustment of the wiping device which is made when the head sprockets of the rake mechanism are adjusted to take up slack in the rake-carrying chains;

Fig. 8 is a plan view on an enlarged scale of a portion of the wiper blade and its mounting, showing the structure whereby adjustment of the angularity of the blade relative to the mounting arms is accomplished;

Fig. 9 is a front elevational view of the parts shown in Fig. 8;

Fig. 10 is a cross sectional view on approximately the plane indicated by the line 10—10 in Fig. 9, looking in the direction of the arrows;

Fig. 11 is a view similar to Fig. 10 but taken approximately on the plane indicated by the line 11—11 in Fig. 9 and looking in the opposite direction as shown by the arrows; and Fig. 12 is an end elevational view of the wiper parts shown in Fig. 9, but showing them in the adjusted position indicated in dotted lines in Fig. 7.

Referring first to Figs. 1, 2 and 3, the upper portion of a bar screen 15 is shown in Fig. 1 extending into an opening 16 in the top wall 17 of a conduit or channel 18 in which the liquid to be screened flows from left to right as indicated by the arrows. Mounted on said channel wall above the opening 16 is a metal housing 19, the upper portion of each side plate of which carries a take-up device 20 which devices journal the transversely extending head shaft 21 of the cleaning rake mechanism, which shaft is adapted to be driven by a suitable motor 22 through a chain or belt drive 23. The said shaft carries a pair of transversely spaced sprockets 25 about each of which is trained an endless strand of chain 26, which chains mount a series of rake elements 27.

As here shown, each of these elements comprises a tubular member 28 of rectangular cross section, extending between and having its respective ends appropriately attached to the chains 26, and to the forward face of which (as regards its direction of travel) is secured a rectangular rake plate 29, the inward longitudinal edge of which is provided with a series of teeth 30 adapted to enter and travel in the slots between the bars of the screen 15. A strip of metal 31 is secured to the outward longitudinal edge of the plate 29 and extends angularly therefrom to the adjacent rearward corner of the tubular member 28 to which it is welded or otherwise secured, all as will be clear from Fig. 3.

Intermediate the head sprockets 25 the shaft 21 carries a drum or drums 32 the periphery of which is engaged by the arcuate upper end portions 33 of an imperforate apron or deadplate 34 that extends downwardly to the top of screen 15 and the function of which is to prevent debris that is being carried upwardly from the screen by the rake elements from slipping therefrom and dropping through the conduit opening 16 to the screened water beyond the screen. This apron or deadplate is essentially the same as that disclosed in prior Patent No. 2,102,570 to Arthur C. Lind.

In addition to the specific construction of the rake elements, the present rake mechanism also differs from that of both of the above mentioned patents in that a pair of idler sprockets 35 are mounted in the housing 19 just below the head sprockets 25, such idlers being carried by a shaft 36 which is journaled in bearings carried by the side plates of said housing. The downwardly moving back runs of the respective chains 26 are trained inwardly of the chain loop by these idlers, as clearly shown in Fig. 3, whereby the chains are caused to embrace the head sprockets throughout an angle on the order of 240°, and from the point of leaving the head sprockets to that of entry upon the idlers 35 they travel in a direction which is more nearly horizontal than vertical.

Adjacent and rearwardly of the idler sprockets 35 the housing 19 is provided with a trash hopper 37 arranged to receive the screenings from the rake elements as they traverse a rearward sector of the head sprockets and transfer such debris to a suitable receptacle or other disposal means, not shown.

The present rake-wiping mechanism comprises a rectangular plate 40 constituting the wiper blade, which plate is of a width somewhat greater than that of the rake plates 29 and preferably is transversely curved substantially as shown in Figs. 3, 10 and 12, as this contributes to quietness of operation. It is provided with a plurality of strengthening ribs 41 attached to its under face, and the ends of these ribs as well as the rearward edge portion of the plate are rigidly secured as by welding to a tube 42. Each end portion of this tube is journaled and adjustably clamped in a split sleeve 43 carried by the outer end of the arm 44 of a bell-crank lever 45, which levers are secured to a shaft 46 that is journaled in bearings 47 mounted on the side plates of the housing 19. The other arms 48 of the bell-cranks 45 have adjustable counterweights 49 mounted thereon, and such arms are arranged to normally rest upon adjustable stop screws 50 which are carried by an angle bar 51 extending between and supported by the housing side plates.

The split sleeves 43 of the bell-cranks 45 are provided with complemental ears 54 carrying clamping bolts 55 whereby the sleeves may be normally rigidly secured to the wiper blade tube 42; and each sleeve is further provided with a lug 56 to which is attached one element 57 of a conventional fluid shock-absorbing or motion checking device 58, the other element 59 of which is attached to a bracket 60 carried by the housing 19.

The parts are so constructed and assembled as to normally occupy substantially the positions illustrated in Fig. 3 when the head shaft 21 and sprockets 25 are in the lowered position shown in full lines therein. In this position the forward or right hand portion of the wiper blade 40 lies within the path of travel of the rake elements 27 and in angular relation thereto and as such an element carrying screenings from the bar screen 15 moves counterclockwise around the head sprockets the forward face of its plate 29 is brought into engagement with the forward or right hand edge of the curved wiper blade 40, as shown in full lines in Fig. 4. Preferably the parts are so adjusted that the line of initial contact between the rake plate and wiper blade is approximately one-half inch inwardly from the outward edge of the rake.

Following such initial engagement between the members 29 and 40, further movement of the rake element causes the wiper mechanism to swing clockwise about the axis of its mounting shaft 46 against the action of the counterweights 49, and because of the overlapping of the oppositely facing arcs of travel of the rake element and wiper blade, as indicated in Fig. 4, the edge of the latter sweeps across the forward face of the former until the parts reach the positions depicted in dotted lines in said figure. This dislodges the debris carried by the rake element, which drops into the hopper 37.

Continued movement of the rake brings the parts to the full line position of Fig. 5 where, because the rearward or left hand portion of the blade 40 extends beyond the path of travel of the unserrated outward edge of the rake plate, such edge contacts the face of the wiper blade on a line proximate to the mounting tube 42 of the blade. Further movement of the rake continues the clockwise swing of the wiper blade, with the said rake edge traversing the blade face as shown in dotted lines in Fig. 5, which dislodges any screenings that may have been transferred to the wiper blade and deposits them in the hopper 37.

During the above described movements the counterweights have continuously maintained the contact between the rake element and wiper blade and by the time the outward edge of the rake reaches the forward edge of the wiper blade the said weights have been raised to approximately the dotted line position of Fig. 5. As the said rake edge passes said wiper edge the latter transfers to the inclined member 31 of the rake element and under the influence of the weights 49 the wiper begins a counterclockwise movement to its initial position. During the first part of this movement the blade edge sweeps the rake member 31, as shown in full lines in Fig. 6, removing any screenings which may have adhered to this face of the rake element, and when continued movement of the rake element clears the wiper blade from the strip 31 the weights 49 return the wiper to the dotted line position of Fig. 6, which is the same as the full line position of Fig. 4. The return movement of the wiper mechanism is retarded or cushioned by the checking devices 58 but is accomplished in ample time for the wiper to be ready for another cycle of operation when the next brake element 27 arrives.

As previously mentioned, the parts of the wiper mechanism have been illustrated in Figs. 2–6 inclusive in the positions necessary for proper operation when the head shaft 21 and sprockets 25 are in a lowered position as determined by the take-up devices 20. If the said shaft and sprockets be raised by the take-ups to remove slack in the chains 26, as indicated in broken lines in Fig. 3, adjustment of the wiper mechanism is also necessary in order for it to function properly.

This is illustrated in Fig. 7, wherein the full line position of the wiper mechanism is the same as that shown in Figs. 3 and 4, when the head shaft 21 and sprockets 25 are in lowered position, which is indicated in broken lines in Fig. 7. It will be noted however, that a rake element 27 traversing the periphery of the sprockets when they are raised to the dotted line position in this figure would so approach the said full line position of the wiper blade 40 that initial contact between the two members would occur approximately medially of the rake plate 29 and thus only a portion of the rake face would be swept by the wiper blade.

It is therefore desirable to change the normal position of the wiper mechanism to substantially that indicated in dotted lines in Fig. 7, which change is accomplished in part by lowering the stop screws 50 whereby the weights 49 may swing the bell-crank levers 45 to said dotted line position. To secure optimum results, however, it is also necessary to alter the angularity of the wiper blade 40 relative to the bell-crank arms 44, which is accomplished by loosening the clamping bolts 55, arcuately adjusting the blade in the split sleeves 43 of said arms until the proper line of contact between the blade and the outward edge portion of the rake element is attained, and then retightening the bolts 55.

Inasmuch as the wiping blades are from five to ten feet or even more in length and therefore of substantial weight, it is desirable to provide mechanical means for effecting or assisting in the above mentioned arcuate adjustments of the blades. To this end, as best shown in Figs. 8–12, a sector plate or member 65 is rigidly secured to the tubular member 42 of the wiper blade structure adjacent each of the journal portions thereof, and a similar sector member 66 is secured to each of the split sleeves 43 of the bell-cranks 45, the respective pairs of sectors 65 and 66 being disposable in complemental axially spaced relation as shown in Figs. 8 and 9. Extending laterally from the medial portion of the inward face of each sector 65 is an integral or rigidly attached block or projection 67 having oppositely arranged arcuate faces 68. A pair of arcuately spaced threaded lugs or nuts 69 extend laterally from the inward face of each sector member 66 adjacent the radial edges thereof, and carry set screws 70 provided with lock nuts 71.

In the assembled position the nuts 69 of the sectors 66 are in transverse alinement with the projections 67 of the sectors 65 but arcuately spaced from the curved faces 68 thereof, against which the inner ends of the set screws 70 are jammed and locked by the lock nuts 71, as indicated in Fig. 11. The wiper blade 40 is thus normally positively locked against unintentional angular displacement relative to the arms 44, but when adjustment such as indicated in Fig. 7 is necessary, after relieving the clamping bolts 55, by backing off one set screw 70 and advancing the other the desired angularity may be readily attained, as shown in Fig. 12, after which the bolts 55 are retightened.

Bar screen apparatus of the character here involved is sometimes installed with the screens perpendicular to the direction of liquid flow, while in other instances they are given rearward inclination of up to 30° from the vertical. The present rake wiping mechanism is adaptable to and will function quietly with any of these installations, and by reason of the reciprocal cleaning action of the rake elements 27 and wiping blade 40 when constructed and arranged substantially as above described, it will efficiently handle all types of screenings including fibrous and textile materials such as are sometimes encountered in sanitation work.

What is claimed is:

1. Wiping blade mechanism for discharging screenings from the traveling cleaning-rake elements of a bar screen installation, said mechanism comprising a pair of arms; means for oscillatably mounting said arms adjacent the path of travel of said rake elements; a wiping blade structure arcuately adjustably carried by said arms for screenings-discharging engagement with said elements; and means for adjusting said structure to selected arcuate relationships to the arms, comprising complemental members carried respectively by the blade structure and arms, one of which members is provided with a projecting portion and the other of which carries set screws alined with said projecting portion and engaging opposed faces thereof.

2. Wiping blade mechanism for discharging screenings from the traveling cleaning-rake elements of a bar screen installation, said mechanism comprising a pair of arms; means for oscillatably mounting said arms adjacent the path of travel of said rake elements; a wiping blade structure journaled in said arms; and means for adjusting said blade structure to various arcuate relationships to the arms, comprising sector members carried respectively by the blade structure and arms adjacent the journal portions thereof and extending radially therefrom, such members being arranged in complemental axially spaced pairs, one member of each pair having a projection disposed in the space between them and provided with oppositely arranged curved faces, and the complemental member being provided with arcuately spaced bolts alined with said projection and engaging the curved faces thereof.

References Cited in the file of this patent

UNITED STATES PATENTS

| | | |
|---|---|---|
| 1,889,055 | Weaton et al. | Nov. 29, 1932 |
| 2,291,103 | Plummer | July 28, 1942 |
| 2,636,593 | Baehr | Apr. 28, 1953 |
| 2,696,308 | Martin | Dec. 7, 1954 |

FOREIGN PATENTS

| | | |
|---|---|---|
| 9,541 | Great Britain | 1911 |